US009092364B2

(12) United States Patent  
Galbraith et al.

(10) Patent No.: US 9,092,364 B2  
(45) Date of Patent: Jul. 28, 2015

(54) IMPLEMENTING STORAGE ADAPTER PERFORMANCE CONTROL (71) Applicant: International Business Machines Corporation, Armonk, NY (US)

(72) Inventors: Robert E. Galbraith, Rochester, MN (US); Adrian C. Gerhard, Rochester, MN (US); Murali N. Iyer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 13/644,717

(22) Filed: Oct. 4, 2012

(65) Prior Publication Data

US 2014/0101479 A1 Apr. 10, 2014

(51) Int. Cl.  
G06F 11/00 (2006.01)  
G06F 11/10 (2006.01)

(52) U.S. Cl.  
CPC .................................. *G06F 11/1076* (2013.01)

(58) Field of Classification Search  
USPC ........................................ 714/47.1, 48, 2, 25  
See application file for complete search history.

(56) References Cited

U.S. PATENT DOCUMENTS

| 6,324,599 | B1 | 11/2001 | Zhou et al. |
|---|---|---|---|
| 6,684,270 | B1 | 1/2004 | Chmara et al. |
| 7,680,968 | B2 | 3/2010 | Burton |
| 7,793,042 | B2 | 9/2010 | Reeves et al. |
| 7,953,909 | B2 | 5/2011 | Zimoto et al. |
| 7,966,451 | B2 | 6/2011 | Balakrishnan |
| 8,082,460 | B2 | 12/2011 | Oya et al. |
| 8,086,789 | B2 | 12/2011 | Tanaka et al. |
| 2003/0133405 | A1 | 7/2003 | Blorec et al. |
| 2004/0162926 | A1 | 8/2004 | Levy |
| 2004/0268177 | A1* | 12/2004 | Ji et al. ............................... 714/6 |
| 2005/0114561 | A1 | 5/2005 | Lu et al. |
| 2007/0028136 | A1* | 2/2007 | Forhan et al. ...................... 714/6 |
| 2007/0088975 | A1* | 4/2007 | Ashmore et al. .................. 714/6 |
| 2007/0162637 | A1 | 7/2007 | Mirabeau et al. |
| 2008/0059699 | A1 | 3/2008 | Kubo et al. |
| 2008/0244227 | A1 | 10/2008 | Gee et al. |
| 2008/0263307 | A1 | 10/2008 | Adachi |
| 2009/0138627 | A1 | 5/2009 | Shad et al. |
| 2009/0228660 | A1 | 9/2009 | Edwards et al. |
| 2010/0199039 | A1 | 8/2010 | Bauman et al. |
| 2011/0029807 | A1* | 2/2011 | Fry et al. ............................ 714/5 |
| 2011/0066808 | A1 | 3/2011 | Flynn et al. |
| 2011/0213994 | A1 | 9/2011 | Thereska et al. |

(Continued)

OTHER PUBLICATIONS

Laing, C. et al, DS8000 Perfomrance Monitoring and Tuning, IBM.com/Redbooks, IBM Corporation; Chapters 4-5, pp. 80-85, Mar. 2009.

(Continued)

*Primary Examiner* — Sarai Butler  
(74) *Attorney, Agent, or Firm* — Joan Pennington (57) ABSTRACT

A method and controller for implementing storage adapter performance control, and a design structure on which the subject controller circuit resides are provided. The controller includes a performance state machine controlling the use of a performance path and a normal or error recovery path in a storage adapter firmware stack. The performance state machine determines which storage resources are allowed to use the performance path and properly transitions the running of each storage resource to and from the performance path and normal path mode of operation.

23 Claims, 7 Drawing Sheets

(56) References Cited

U.S. PATENT DOCUMENTS

| | | |
|---|---|---|
| 2011/0264854 A1 | 10/2011 | Ouchi |
| 2011/0283063 A1 | 11/2011 | Takiyanagi |
| 2012/0011313 A1 | 1/2012 | Kopylovitz et al. |
| 2014/0075136 A1* | 3/2014 | Davies .......................... 711/159 |

OTHER PUBLICATIONS

IBM; "ServeRAID B5015 SSD Controller is an enterprise-grade RAID adapter offering the highest performance and data protection optimized for next-generation SSDs", IBM Hardware announcement 110-113, May 18, 2010.

U.S. Appl. No. 13/114,291, filed May 24, 2011, by Brian E. Bakke et al., entitled "Implementing Storage Adapter Performance Optimization With Hardware Chains to Select Performance Path".

U.S. Appl. No. 13/114,354, filed May 24, 2011 by Brian E. Bakke et al., entitled ,"Implementing Storage Adapter Performance Optimization With Chained Hardware Operations and Error Recovery Firmware Path".

* cited by examiner

300
BASE CONDITIONS FOR AN ARRAY TO BE ALLOWED IN PERFORMANCE PATH MODE:

- NO DATA CHECK RECOVERY IN PROGRESS 302
- NO DEVICE FAILURE IN PROGRESS 304
- NO LINK NOT OPERATIONAL IN PROGRESS 306
- ARRAY NOT DEGRADED (EXPOSED) 308
- NO CORRUPT PARITY IN ARRAY 310
- ARRAY HAS SINGLE STRIPE SEQUENCE (NO INCLUDED DEVICES) 312
- NO CONFIGURATION CHANGES IN PROGRESS 314
- NO DATA CONVERT REQUIRED FOR ARRAY 316
- ARRAY IS FUNCTIONAL 318
- NO ARRAY SWITCHOVER IN PROGRESS 320
- NO ADAPTER FAILOVER/TAKEOVER IN PROGRESS 322
- NOT TRANSITIONING TO/FROM WRITE CACHING 324
- ADAPTER NOT IN IPL OR SHUTDOWN PROCESSING 326
- NO LONG RUNNING ARRAY COMMANDS IN PROGRESS 328
- NOT USING DEVICE PUFPS FOR ARRAY 330
- ARRAY HAS BEEN STARTED (START UNIT) BY HOST 332

IMPLEMENTING STORAGE ADAPTER PERFORMANCE CONTROL

FIELD OF THE INVENTION

The present invention relates generally to the data processing field, and more particularly, relates to a method and controller for implementing storage adapter performance control, and a design structure on which the subject controller circuit resides.

DESCRIPTION OF THE RELATED ART

Storage adapters are used to connect a host computer system to peripheral storage I/O devices such as hard disk drives, solid state drives, tape drives, compact disk drives, and the like. Currently various high speed system interconnects are to connect the host computer system to the storage adapter and to connect the storage adapter to the storage I/O devices, such as, Peripheral Component Interconnect Express (PCIe), Serial Attach SCSI (SAS), Fibre Channel, and InfiniBand.

For many years now, hard disk drives (HDDs) or spinning drives have been the dominant storage I/O device used for the persistent storage of computer data which requires online access. Recently, solid state drives (SSDs) have become more popular due to their superior performance. Specifically, SSDs are typically capable of performing more I/Os per seconds (IOPS) than HDDs, even if their maximum data rates are not always higher than HDDs.

Storage adapters providing redundant array of independent drives (RAID) read and write operations, Write Caching and Dual Controllers functions and the like continually need to improve the number of I/O operations per second (IOPS) that can be attained without compromising function. The firmware code path length of the storage adapter is often a factor impacting the overall IOPS and is often the performance bottleneck in the adapter.

Some known storage adapters have two main code paths in the storage adapter firmware stack including a Performance Path and a Normal or Error Recovery Path. A set of predefined I/O operations are identified as performance critical and thus have a Performance Path developed for them, typically using special hardware assist functions. If any error occurs during Performance Path Operations, the I/O operation needs to be bridged to the Normal or Error Recovery Path in order to complete the operation and respond to the host system.

For example, U.S. patent Ser. Nos. 13/114,291 and 13/114,354 filed May 24, 2011 disclose methods and controllers for implementing storage adapter performance optimization with a predefined chain of hardware operations configured to implement a particular performance path minimizing hardware and firmware interactions and to select a firmware sequence for error recovery to complete the operations responsive to an identified error in the predefined chain. The controller includes a plurality of hardware engines; and a data store configured to store a plurality of control blocks selectively arranged in one of a plurality of predefined chains. Each predefined chain defines a sequence of operations. Each control block is designed to control a hardware operation in one of the plurality of hardware engines. Each selected predefined chain is configured to select a particular performance path to maximize performance. A resource handle structure is configured to select a predefined chain based upon a particular characteristic of the storage system. Each selected predefined chain is configured to select a particular performance path to maximize performance. Responsive to an identified predefined error during hardware operations in the predefined hardware chain, a bridge code is configured to select a non-performance path firmware sequence for an error recovery completion sequence to complete remaining operations.

A need exists for an effective method and controller for implementing storage adapter performance control for implementing the use of a Performance Path and a Normal and/or Error Recovery Path in the storage adapter firmware stack. A need exists to provide such method and controller that determines which storage resource may use the Performance Path and properly transitions the running of each storage resource to/from the Performance Path and Normal Path.

As used in the following description and claims, the terms controller and controller circuit should be broadly understood to include an input/output (IO) adapter (IOA) and includes an IO RAID adapter connecting various arrangements of a host computer system and peripheral storage I/O devices including hard disk drives, solid state drives, tape drives, compact disk drives, and the like.

SUMMARY OF THE INVENTION

Principal aspects of the present invention are to provide a method and a controller for implementing storage adapter performance control, and a design structure on which the subject controller circuit resides. Other important aspects of the present invention are to provide such method, controller, and design structure substantially without negative effects and that overcome many of the disadvantages of prior art arrangements.

In brief, a method and controller for implementing storage adapter performance control, and a design structure on which the subject controller circuit resides are provided. The controller includes a performance state machine controlling the use of a performance path and a normal or error recovery path in a storage adapter firmware stack. The performance state machine determines which storage resources are allowed to use the performance path and properly transitions the running of each storage resource to and from the performance path and normal path mode of operation.

In accordance with features of the invention, when all the base conditions are met for at least one resource, then the performance state machine pre-allocates parity update footprints, temporarily quiesces parity update footprints, and then allows performance path mode of operation of the given resources to use of a set of predefined performance paths for a corresponding set of predefined I/O operations.

In accordance with features of the invention, while the controller is running in the performance path mode of operation if any predetermined event occurs which would change the base condition of a resource being allowed to use a performance path, for example, a device fails which would lead to a RAID array becoming exposed, then all resources will be disallowed from performance path mode. In order to transition back to a normal path mode of operation, a synchronization (Sync) function ensures that all of the outstanding performance path operations have either completed or begun a bridge, for example, due to an error occurring, back to the normal path being entered for all resources.

In accordance with features of the invention, in a normal path mode of operation for all resources, the adapter is allowed to perform any function which would be a violation of the performance path mode of operation. For example, once in a normal path mode of operation for all resources, the adapter allows a device failure to be processed and a storage resource, such as a RAID array to become exposed.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and controller for implementing performance control, and a design structure on which the subject controller circuit resides are provided. The method and controller of the invention control the use of a Performance Path and a Normal and/or Error Recovery Path in the storage adapter firmware stack. The method and controller determines which storage resources may use the Performance Path and properly transitions the running of each storage resource to/from the Performance Path and Normal Path. A method is provided to allow or disallow storage resources from using a Performance path by checking a list of base assumptions. A method is provided to allow or disallow performance mode of selected storage resources, such as Logical Units, RAID arrays and the like that are seen by a host system. A method is provided to quiesce, pre-allocate and un-quiesce foot prints for performance path operation. A method is provided to complete and/or bridge performance path IO Operations to Normal/Error Recovery path operations providing a synchronization (sync) function.

Figure 1:
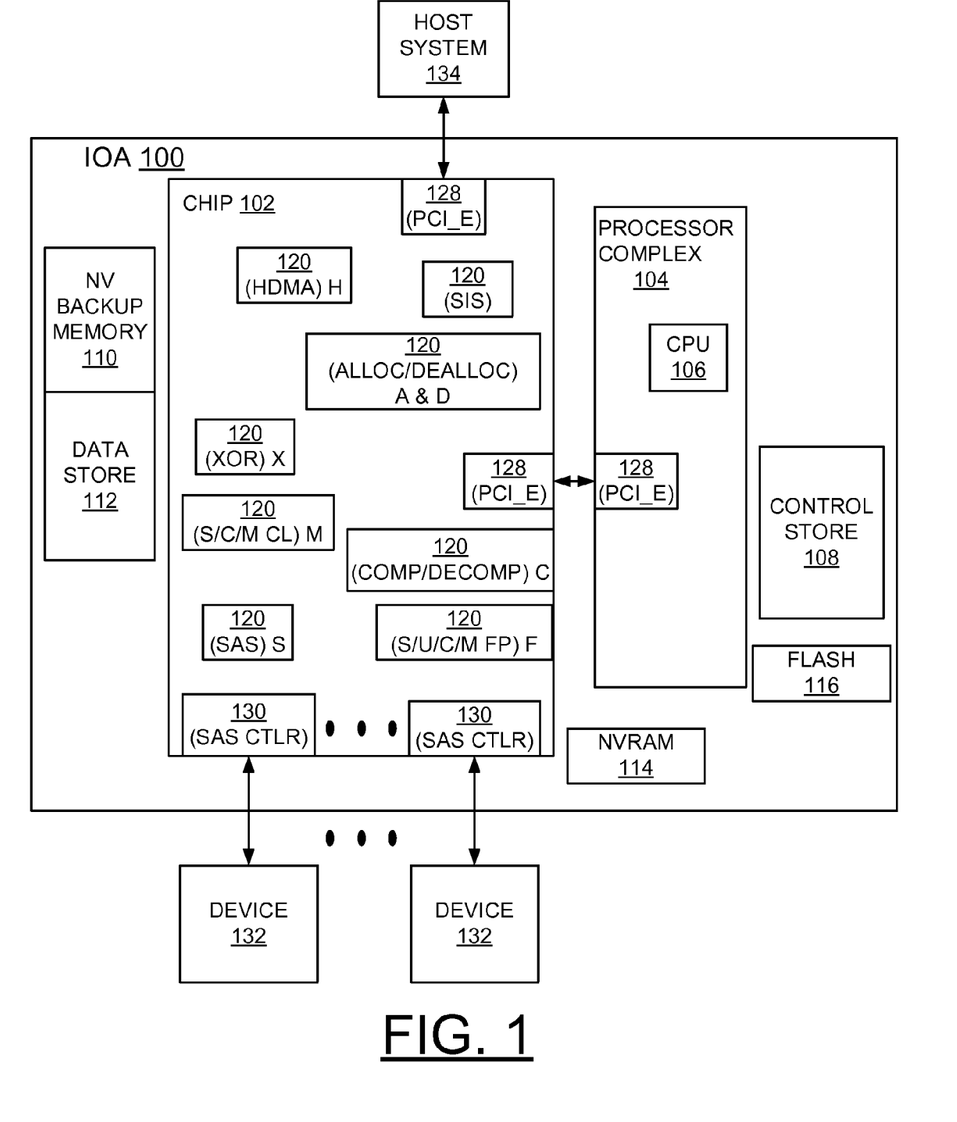
FIG. 1 is a schematic and block diagram illustrating an exemplary system with a controller for implementing storage adapter performance control in accordance with the preferred embodiment.

Having reference now to the drawings, in FIG. 1, there is shown an input/output adapter (IOA) or controller in accordance with the preferred embodiment generally designated by the reference character 100. Controller 100 includes a semiconductor chip 102 coupled to at least one processor complex 104 including one or more processors or central processor units (CPUs) 106. Controller 100 includes a control store (CS) 108, such as a dynamic random access memory (DRAM) proximate to the CPU 106 providing command block, work queue and event queue storage. Controller 100 includes a non-volatile (NV) backup memory 110 and a data store (DS) 112 providing data and scratch buffers for command block set up and processing, for example, performed by hardware. Controller 100 includes a non-volatile random access memory (NVRAM) 114, and a flash memory 116.

In accordance with features of the invention, controller 100 implements methods that control the use of a Performance Path and a Normal and/or Error Recovery Path in the storage adapter firmware stack. The controller determines which storage resources may use the Performance Path and properly transitions the running of each storage resource to/from the Performance Path and Normal Path.

Controller semiconductor chip 102 includes a plurality of hardware engines 120, such as, a hardware direct memory access (HDMA) engine 120, a SIS engine 120, an allocate and de-allocate engine 120, an XOR or sum of products (SOP) engine 120, a Serial Attach SCSI (SAS) engine 120, a set/update/clear/mirror footprint (S/U/C/M FP) engine 120, and a compression/decompression (COMP/DECOMP) engine 120. Substantial conventional firmware function is moved to HW operations performed by the hardware engines 120. The hardware engines 120 are completely heterogeneous, and are fully extensible with chaining any engine to any other engine enabled.

As shown, controller semiconductor chip 102 includes a respective Peripheral Component Interconnect Express (PCIe) interface 128 with a PCIe high speed system interconnect between the controller semiconductor chip 102 and the processor complex 104, and a Serial Attach SCSI (SAS) controller 130 with a SAS high speed system interconnect between the controller semiconductor chip 102 and each of a plurality of storage devices 132, such as hard disk drives (HDDs) or spinning drives 132, and solid state drives (SSDs) 132. A host system 134 is connected to the controller 100, for example with a PCIe high speed system interconnect. It should be understood that an external processor complex 104 is not required and could be embedded in the controller semiconductor chip 102.

The controller semiconductor chip 102 and control store (CS) 108 implement performance state machine and performance control such as illustrated and described with respect to FIGS. 2, 3, 4, 5, and 6. Other structures in the CS 108 include FW structures and stacks.

Figure 2:
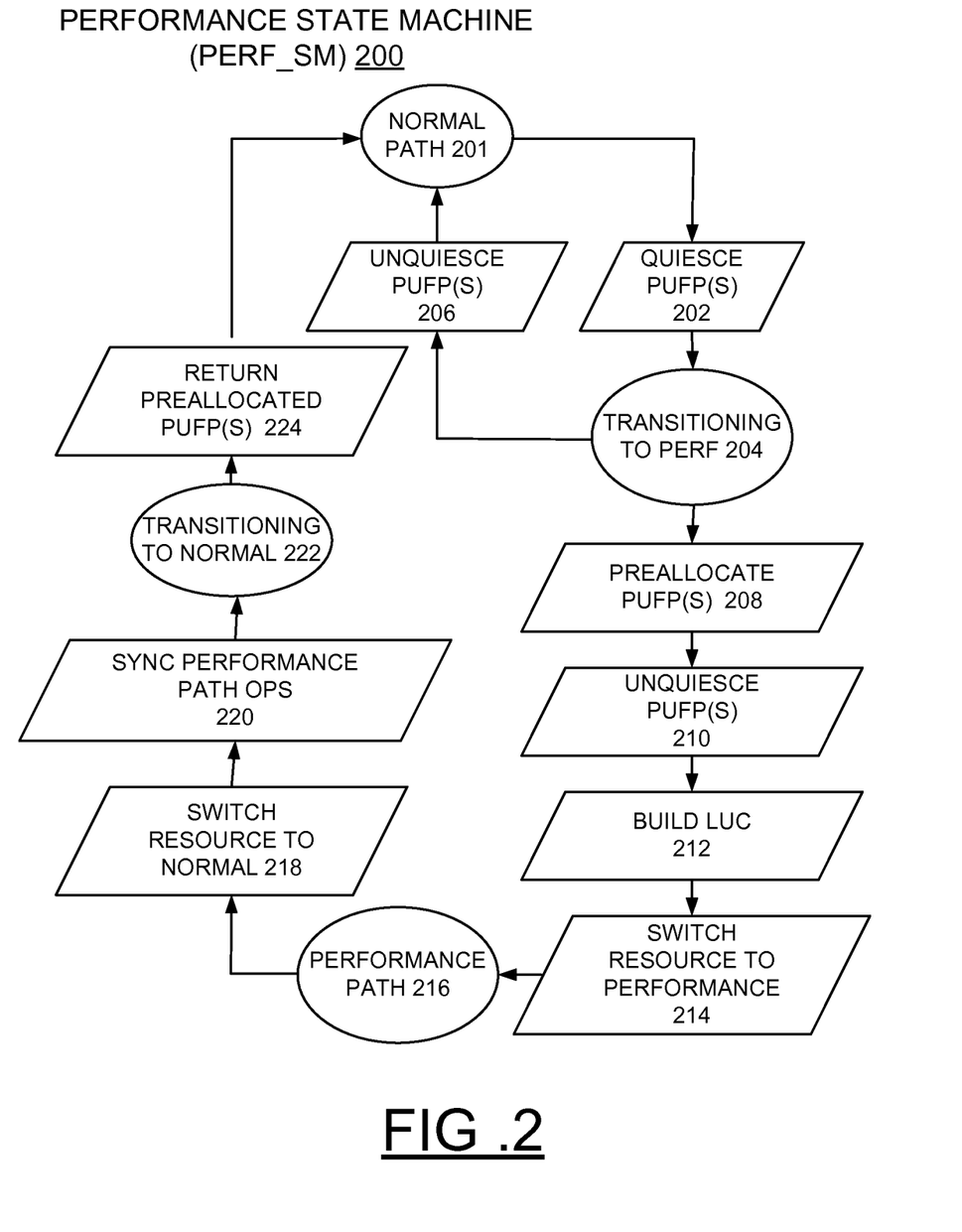
FIG. 2 illustrates an example performance state machine control included with the controller for implementing storage adapter performance control of FIG. 1 in accordance with the preferred embodiment.

Referring to FIG. 2, there are shown an example performance state machine (PERF_SM) generally designated by the reference character 200 included with the controller semiconductor chip 102 for implementing storage adapter performance control in accordance with the preferred embodiment. PERF_SM 200 includes a Normal Path as indicated at a block 201 that is provided, for example, when predefined base conditions, such as example base conditions 300 illustrated and described with respect to FIG. 3, of performance state machine control are not met. As indicated at a block 202, quiesce or render inactive parity update footprints (PUFPs) operation or control structure is provided for transitioning to performance mode as indicated at a block 204. When returning to the a Normal Path at block 201, then an unquiesce or render active parity update footprints (PUFPs) operation or control structure is provided as indicated at a block 206.

From the transitioning to performance mode block 204, pre-allocating parity update footprints (PUFPs), are provided as indicated at a block 208, an unquiesce or render active parity update footprints (PUFPs) operation or control structure is provided as indicated at a block 210, build logical unit configuration (LUC) data returning LUC vectors or function pointers to use for the specific performance path as indicated at a block 212, and switching resource to performance as indicated at a block 214. PERF_SM 200 includes a Performance Path mode as indicated at a block 216. The Performance Path mode at block 216 is used when predefined base conditions are met. For example, the Performance Path mode at block 216 is used when the adapter is running in a steady state, and including when not in process of initial program load (IPL), not in process of being shutdown, not transitioning to or from write caching.

PERF_SM 200 transitions from the Performance Path at block 216 to the normal path at block 201 with switching resource to normal as indicated at a block 218, and synchronizing performance path operations or providing a synchronization (sync) function as indicated at a block 220 for transitioning to normal mode as indicated at a block 222. From the transitioning to normal mode at block 222, pre-allocated parity update footprints (PUFPs) are returned as indicated at a block 224, and the normal path mode at block 201 is provided.

Figure 3:
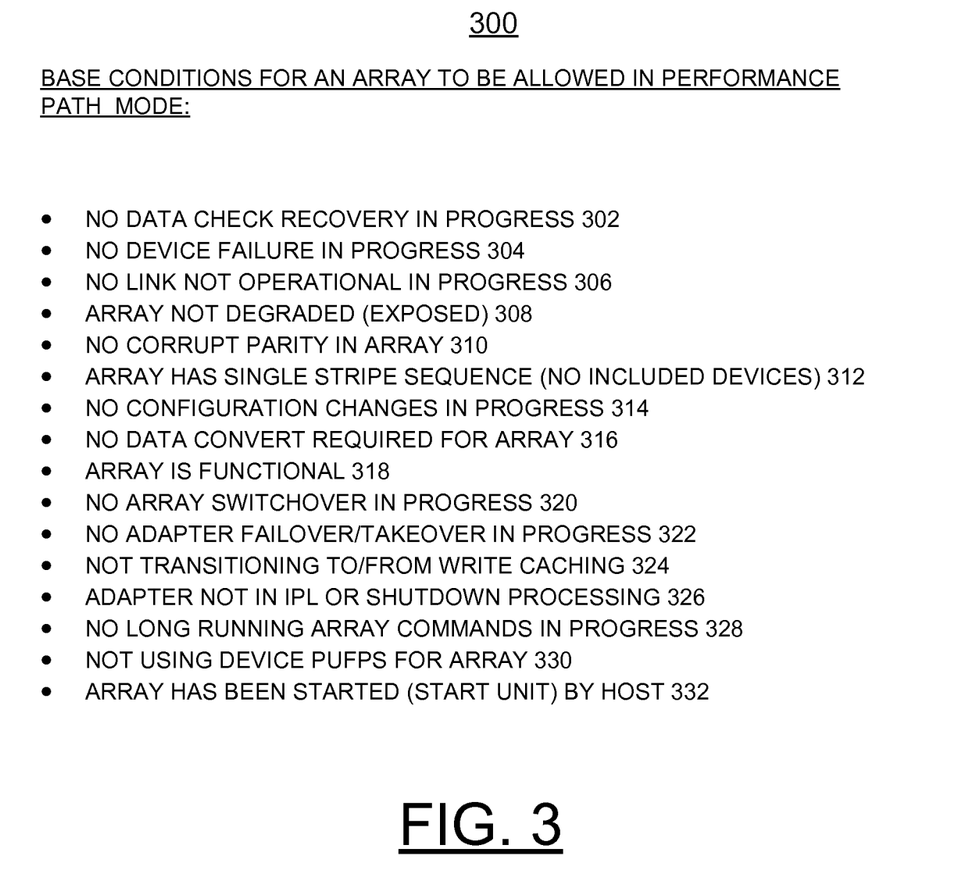
FIG. 3 illustrates a plurality of example base conditions performance state machine control for implementing storage adapter performance control in accordance with the preferred embodiment.

Referring also to FIG. 3, there are shown a plurality of example base conditions generally designated by the reference character 300 checked by performance state machine 200 for implementing storage adapter performance control in accordance with the preferred embodiment. As shown, example base conditions 300 include no data check recovery in progress 302, no device failure in progress 304, no link not operational in progress 306, array not degraded (exposed) 308, no corrupt parity in array 310, array has single stripe sequence (no included devices) 312, no configuration changes in progress 314, no data convert required for array 316, array is functional 318, no array switchover in progress 320, no adapter failover/takeover in progress 322, not transitioning to/from write caching 324, adapter not in IPL (initial program load) or shutdown processing 326, no long running array commands in progress 328, not using device PUFPS (parity update footprints) for array 330, array has been started (start unit) by host 332, and the like.

In accordance with features of the invention, initially all the resources (e.g. RAID arrays, a single drive or any of just a bunch of drives (JBOD) drives) start in the Normal Path 201. The Performance State Machine 200 determines whether any resource (for example, a RAID array,) is capable of using a Performance Path mode of operation by examination of all the required base assumptions 300, as illustrated in FIG. 3. If all the base assumptions are met for at least one resource, then the Performance State Machine pre-allocates parity update footprints 208, unquiesces parity update footprints 210, builds LUC 212, switches resource to performance 214, and provides the Performance Path mode 216 of the given resource.

In accordance with features of the invention, while the adapter is running in a Performance Path mode 216, if any predetermined event occurs which would change the base assumptions of a resource being allowed to use a Performance Path (for example, a device fails which would lead to a RAID array becoming exposed), then all resources will be disallowed from Performance Path mode, 218. In order to transition back to a Normal Path mode of operation 222, it must be known that all of the outstanding Performance Path operations have either completed or begun a bridge (due to an error occurring) back to the Normal Path. This process requires a Sync function 220 to ensure this has occurred prior to processing the event which changed the base assumptions 300.

In accordance with features of the invention, once in a Normal Path mode 201 of operation for all resources, the adapter is allowed to perform any function which would be a violation of the Performance Path mode of operation. For example, once in a Normal Path mode of operation for all resources, the adapter may allow a device failure to be processed and a RAID array to become exposed.

Figure 4:
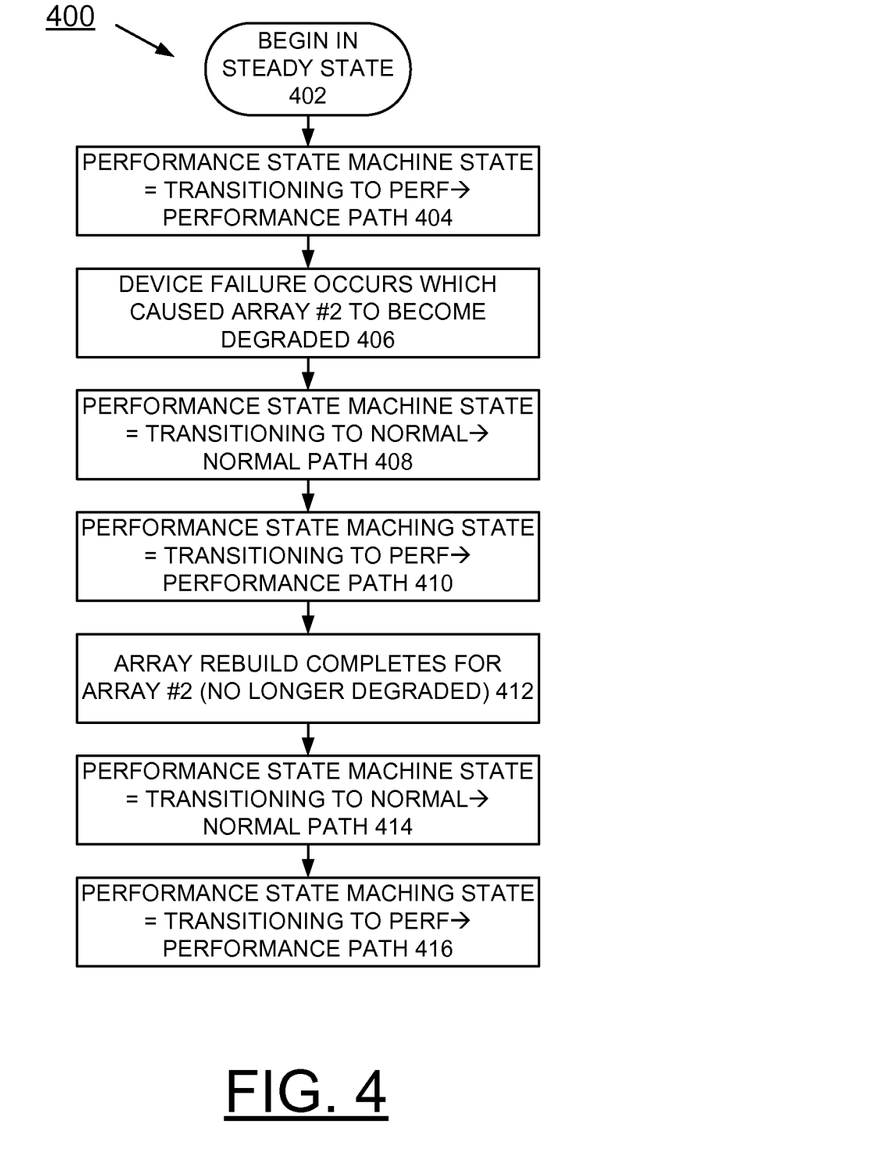
FIGS. 4, 5, and 6 are respective flow charts illustrating example performance state machine control operations for implementing storage adapter performance control in accordance with the preferred embodiment in accordance with the preferred embodiment.
Figure 5:
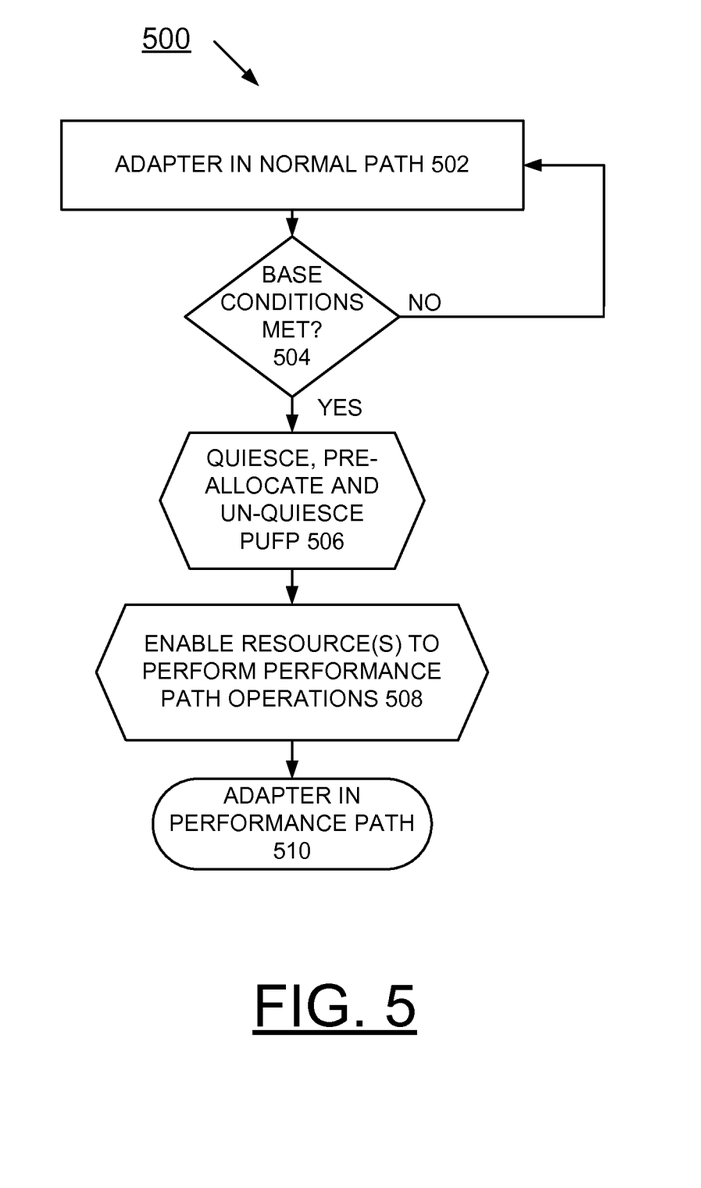
Figure 6:
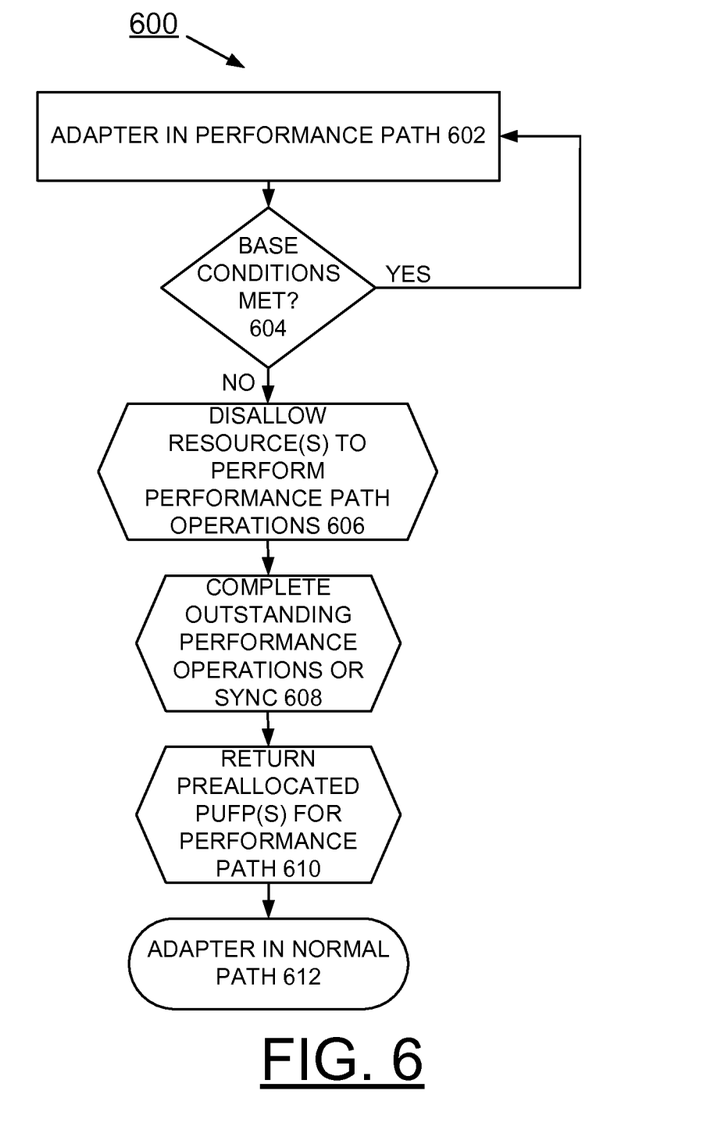

FIGS. 4, 5, and 6 are respective flow charts illustrating example performance state machine control operations for implementing storage adapter performance control in accordance with the preferred embodiment.

Referring to FIG. 4, there are shown example performance state machine control operations generally designated by the reference character 400 of arrays going from performance path mode to normal path mode and to performance path mode in accordance with the preferred embodiment. Operation begins in steady state as indicated at a block 402. As indicated at a block 404, performance state machine state equals transition to performance to performance path, for example, where three arrays #1, #2, #3 have array states of array #1 performance mode, array #2 performance mode, and array #3 performance mode.

As indicated at a block 406, a device failure occurs which caused array #2 to become degraded. As indicated at a block 408, performance state machine state equals transition to normal to normal path, for example, where three arrays #1, #2, #3 have array states of array #1 normal mode, array #2 normal mode, and array #3 normal mode. Next as indicated at a block 410, performance state machine state equals transition to performance to performance path, for example, where three arrays #1, #2, #3 have array states of array #1 performance mode, array #2 normal mode, and array #3 performance mode. As indicated at a block 412, an array rebuild completes for array #2 to become no longer degraded. Then as indicated at a block 414, performance state machine state equals transition to normal to normal path, for example, where three arrays #1, #2, #3 have array states of array #1 normal mode, array #2 normal mode, and array #3 normal mode. Next as indicated at a block 416, performance state machine state equals transition to performance to performance path, for example, where three arrays #1, #2, #3 have array states of array #1 performance mode, array #2 performance mode, and array #3 performance mode.

Referring to FIG. 5, example performance state machine control operations generally designated by the reference character 500 of adapter 102 going from normal path mode and to performance path mode with quiesce, pre-allocate, and unquiesce parity update footprints (PUFPs) for performance path mode in accordance with the preferred embodiment. As indicated at a block 502, flow begins with adapter in normal path mode. Checking for base conditions to be met is performed as indicated at a decision block 504. When base conditions are not met, then operation continues with adapter in normal path. When base conditions are met, then operations continue with quiesce, pre-allocate and un-quiesce PUFP operations as indicated at a block 506. Next as indicated at a block 508 one or more resources are enabled to perform performance path operations. As indicated at a block 510, the adapter continues in performance path mode.

Referring to FIG. 6, example performance state machine control operations generally designated by the reference character 600 of adapter 102 going from performance path mode and to normal path mode with in accordance with the preferred embodiment. As indicated at a block 602, flow begins with adapter in performance path mode. Checking for base conditions to be met is performed as indicated at a decision block 604. When base conditions are met, then operations continue with adapter in performance path mode. When base conditions are not met, then operation continues to disallow resources to perform performance path operations as indicated at a block 606. Examples of resources at block 606 are RAID array or SSD or HDD member of RAID array. The synchronization function as indicated at a block 608 ensures all outstanding performance path operations are completed or bridged to normal or error recovery path. Then as indicated at a block 610, pre-allocated PUFPs for performance path are returned. As indicated at a block 612, the adapter continues in normal path mode.

Figure 7:
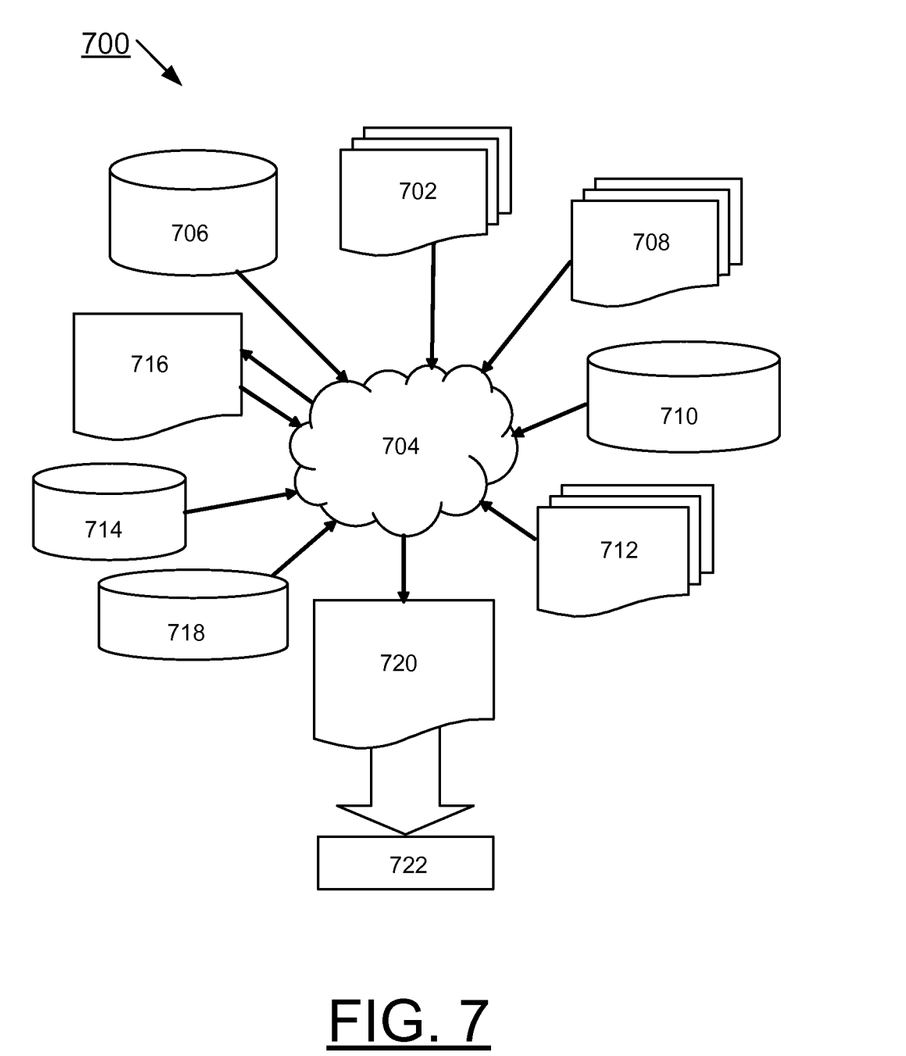
FIG. 7 is a flow diagram of a design process used in semiconductor design, manufacturing, and/or test.

FIG. 7 shows a block diagram of an example design flow 700. Design flow 700 may vary depending on the type of IC being designed. For example, a design flow 700 for building an application specific IC (ASIC) may differ from a design flow 700 for designing a standard component. Design structure 702 is preferably an input to a design process 704 and may come from an IP provider, a core developer, or other design company or may be generated by the operator of the design flow, or from other sources. Design structure 702 comprises controller 100 and performance state machine 200 in the form of schematics or HDL, a hardware-description language, for example, Verilog, VHDL, C, and the like. Design structure 702 may be contained on one or more machine readable medium. For example, design structure 702 may be a text file or a graphical representation of controller 100 and performance state machine 200. Design process 704 preferably synthesizes, or translates, controller 100 and performance state machine 200 into a netlist 706, where netlist 706 is, for example, a list of wires, transistors, logic gates, control circuits, I/O, models, etc. that describes the connections to other elements and circuits in an integrated circuit design and recorded on at least one of machine readable medium. This may be an iterative process in which netlist 706 is resynthesized one or more times depending on design specifications and parameters for the circuit.

Design process 704 may include using a variety of inputs; for example, inputs from library elements 708 which may house a set of commonly used elements, circuits, and devices, including models, layouts, and symbolic representations, for a given manufacturing technology, such as different technology nodes, 32 nm, 45 nm, 90 nm, and the like, design specifications data 710, characterization data 712, verification data 714, design rules 716, and test data files 718, which may include test patterns and other testing information. Design process 704 may further include, for example, standard circuit design processes such as timing analysis, verification, design rule checking, place and route operations, and the like. One of ordinary skill in the art of integrated circuit design can appreciate the extent of possible electronic design automation tools and applications used in design process 504 without deviating from the scope and spirit of the invention. The design structure of the invention is not limited to any specific design flow.

Design process 704 preferably translates an embodiment of the invention as shown in FIGS. 1, 2, 3, 4, 5, and 6 along with any additional integrated circuit design or data (if applicable), into a second design structure 720. Design structure 720 resides on a storage medium in a data format used for the exchange of layout data of integrated circuits, for example, information stored in a GDSII (GDS2), GL1, OASIS, or any other suitable format for storing such design structures. Design structure 720 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1, 2, 3, 4, 5, and 6. Design structure 720 may then proceed to a stage 722 where, for example, design structure 720 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A data storage system comprising:
a controller comprising
a performance state machine for controlling the use of a performance path and a normal or error recovery path in a storage adapter firmware stack; the performance path including set of predefined I/O operations using predefined hardware assist functions; the normal or error recovery path including any function in violation of a performance path mode of operation;
said performance state machine determining each storage resource allowed to use the performance path; and
said performance state machine transitioning running of at least one of said storage resource allowed to use the performance path to and from the performance path and normal path mode of operation responsive to identifying at least one predefined event.

2. The data storage system as recited in claim 1 wherein said performance state machine checking predefined base conditions for determining each storage resource allowed to use the performance path.

3. The data storage system as recited in claim 2 wherein said performance state machine checking predefined base conditions includes said performance state machine checking for no data check recovery in process.

4. The data storage system as recited in claim 2 wherein said performance state machine checking predefined base conditions includes said performance state machine checking for no device failure in process.

5. The data storage system as recited in claim 2 wherein said performance state machine checking predefined base conditions includes said performance state machine checking for no corrupt parity in array.

6. The data storage system as recited in claim 1 wherein said performance state machine transitioning running of at least one storage resource to and from the performance path and normal path mode of operation includes said performance state machine checking predefined base conditions.

7. The data storage system as recited in claim 6 includes said performance state machine identifying at least one predefined base condition not being met and said performance state machine transitioning running of at least storage resource from the performance path to the normal path mode of operation.

8. The data storage system as recited in claim 6 includes said performance state machine identifying each of the predefined base conditions being met and said performance state machine transitioning running of at least one storage resource from the normal path to the performance path mode of operation.

9. The data storage system as recited in claim 8 includes said performance state machine continuing operations with quiesce, pre-allocate and unquiesce parity update footprint (PUFP) operations allowing use of performance path of the given resources.

10. The data storage system as recited in claim 6 includes said performance state machine providing a synchronization function for transitioning running of at least one storage resource from the performance path to the normal path mode of operation.

11. The data storage system as recited in claim 10 includes said performance state machine using said synchronization function for bridging performance path operations to the normal path mode of operation.

12. A method for implementing storage adapter performance control in a data storage system comprising:
providing a controller comprising a performance state machine; said performance state machine for controlling the use of a performance path and a normal path in a storage adapter firmware stack; the performance path including set of predefined I/O operations using predefined hardware assist functions; the normal or error recovery path including any function in violation of a performance path mode of operation;
said performance state machine determining each storage resource allowed to use the performance path; and
said performance state machine transitioning running of at least one of said storage resource allowed to use the performance path to and from the performance path and normal path mode of operation responsive to identifying at least one predefined event.

13. The method as recited in claim 12 includes said performance state machine checking predefined base conditions for determining each storage resource allowed to use the performance path.

14. The method as recited in claim 13 includes said performance state machine checking for transitioning to or from write caching operations.

15. The method as recited in claim 13 includes said performance state machine checking for no configuration changes in progress for each storage resource.

16. The method as recited in claim 13 wherein said performance state machine transitioning running of at least one storage resource to and from the performance path and normal path mode of operation includes said performance state machine checking predefined base conditions.

17. The method as recited in claim 16 includes said performance state machine identifying each of the predefined base conditions being met and said performance state machine transitioning running of at least one storage resource from the normal path to the performance path mode of operation.

18. The method as recited in claim 16 includes said performance state machine identifying at least one predefined base condition not being met and said performance state machine transitioning running of at least one storage resource from the performance path to the normal path mode of operation.

19. A design structure embodied in a machine readable medium used in a design process, the design structure comprising:
a controller circuit tangibly embodied in the machine readable medium used in the design process, said controller circuit for implementing storage adapter performance control in a data storage system, said controller circuit comprising:
a performance state machine for controlling the use of a performance path and a normal or error recovery path in a storage adapter firmware stack; the performance path including set of predefined I/O operations using predefined hardware assist functions; the normal or error recovery path including any function in violation of a performance path mode of operation;
said performance state machine determining each storage resource allowed to use the performance path; and
said performance state machine transitioning running of at least one of said storage resource allowed to use the performance path to and from the performance path and normal path mode of operation responsive to identifying at least one predefined event, wherein the design structure, when read and used in manufacture of a semiconductor chip produces a chip comprising said controller circuit.

20. The design structure of claim 19, wherein the design structure resides on storage medium as a data format used for exchange of layout data of integrated circuits.

21. The design structure of claim 19, wherein the design structure includes at least one of test data files, characterization data, verification data, or design specifications.

22. The design structure of claim 19 includes said performance state machine checking predefined base conditions for determining each storage resource allowed to use the performance path.

23. The design structure of claim 19 includes said performance state machine checking predefined base conditions for transitioning running of at least one storage resource to and from the performance path and normal path mode of operation.

* * * * *